United States Patent Office 2,895,948
Patented July 21, 1959

2,895,948

POLYBENZIMIDAZOLES

Keith Clark Brinker and Ivan Maxwell Robinson, Wilmington, Del., assignors to E. I. du Pont de Nemours and Company, Wilmington, Del., a corporation of Delaware No Drawing. Application October 28, 1955
Serial No. 543,599

10 Claims. (Cl. 260—78.4)

This invention relates to novel condensation polymers, and more particularly to novel linear polybenzimidazoles.

Since their discovery, linear condensation polymers such as the polyamides and polyesters have found wide application in the plastic industry in the form of fibers, films and molded articles. The polyamides described in Wallace H. Carothers' U.S. Patents 2,071,250 and 2,071,253, issued February 16, 1937, and U.S. Patent 2,130,948, issued September 20, 1938, for example, are tough, wear resistant, resilient, stable polymers, useful over a wide range of conditions. However, the search for improved polymers having higher stiffness and toughness, higher softening points, better retention of stiffness at elevated temperatures, improved resistance to water and oxygen, has continued. The present invention was made as the result of this search for improved polymers.

This invention has as its object the production of new and valuable polymeric materials. A further object is a novel type of linear condensation polymer characterized by high stiffness at room temperature and outstanding retention of toughness and stiffness at elevated temperatures. Further objects reside in the process by which the novel condensation polymers are prepared. Other objects will become apparent hereinafter.

It has now been discovered that the reaction of a carboxylic acid group with an ortho-diaminophenyl group to form a benzimidazole ring can be employed to form linear condensation polymers having the desirable combination of properties described hereinabove. It has been found that in contrast to diamine aliphatic compounds ortho-diaminophenyl groups react rapidly to form an imidazole ring, thus giving rise to linear polymers where compounds having two benzimidazole-forming groups in the molecule are condensed.

Similarly, as polyamides may be obtained by the condensation of diamines with dicarboxylic acids or derivatives thereof, the polybenzimidazoles may be obtained by the condensation of bis-ortho-diaminophenyl compounds with dicarboxylic acids or benzimidazole-forming derivatives thereof. Trifunctional monomers containing an ortho-phenyl-diamino group and a carboxylic acid group may also be employed to form high molecular weight polybenzimidazoles. The tetramines used in the present invention have the following general formula:

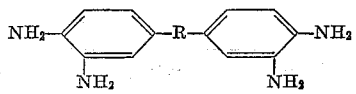

wherein R may be a carbon-to-carbon bond or a divalent hydrocarbon radical. The preferred tetramines used in the polymerization of the polybenzimidazoles of the present invention are 3,3'-diaminobenzidine and those bis-3,4-diaminophenyl compounds having not more than 3 carbon atoms between the phenyl groups. These tetramines are preferred for their ease of preparation and for the outstanding properties resulting in the polybenzimidazoles on polymerizing these tetramines with dicarboxylic acids. By increasing the length of the hydrogen chain beyond three, a significant decrease in melting point and stiffness in the resulting polybenzimidazole occurs. However, the length of the divalent hydrocarbon radical does not affect the polymer-forming properties of the tetramine. The dicarboxylic acids used to form the benzimidazole ring with the tetramines are dicarboxylic acids having the general formula HOOC—R'—COOH, wherein R' is a divalent hydrocarbon radical and preferably a hydrocarbon radical consisting of methylene groups. Particularly useful dicarboxylic acids are those wherein the number of methylene groups varies from 4 to 8. Polybenzimidazoles from these acids combine outstanding physical properties with good fabricability. However, the length of the hydrocarbon chain does not affect the polymer-forming properties of the monomers. These acids are preferred because of the outstanding physical properties of the resulting polybenzimidazole.

The preferred polybenzimidazoles of the present invention are formed as the result of the following condensation reaction:

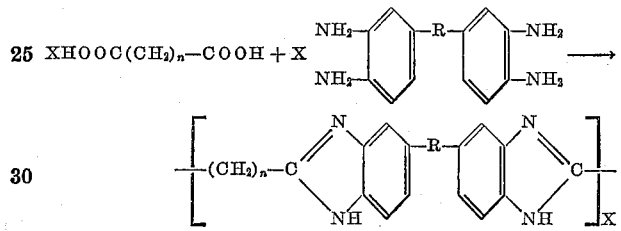

wherein R is a group of the class consisting of diphenyl bonds and divalent hydrocarbon radicals and n is from 4 to 8. The condensation reaction to form the polybenzimidazoles occurs on heating equivalent quantities of the tetramine and the dicarboxylic acid to temperatures of 100 to 350° C. in the absence of oxygen. The polymerization reaction is so rapid and complete that it is not necessary, in contrast to the polymerization of polyamides, to employ either a pressure or vacuum cycle to obtain high molecular weight polybenzimidazoles.

The invention is further illustrated by the following examples, in which all parts are by weight unless otherwise stated.

EXAMPLE I

*Condensation of 3,3'-diaminobenzidine with sebacic acid*

This compound was prepared from benzidine following the procedure of Hoste (Anal. Chim. Acta. 2, 402 (1948), in which benzidine is acetylated, nitrated, deacetylated and reduced to 3,3'-diaminobenzidine.

An autoclave was charged with 10.00 parts of 3,3'-diaminobenzidine and 9.44 parts of sebacic acid. This mixture was flushed with nitrogen and heated at 265° C. for a period of 3.5 hours. The polybenzimidazole thus obtained was found to have an inherent viscosity of 1.05 (0.5% solution in meta-cresol). The polymer could be compression molded into tough transparent films by molding under pressure at a temperature of 340 to 370° C. No apparent decomposition of the polymer occurred. The polymer was found to be essentially amorphous as measured by X-ray diffraction patterns of thin films of the polybenzimidazole. On heating a film for 15 hours at 140° C., X-ray diffraction patterns showed no signs of crystallinity. Infrared analysis of thin polybenzimidazole films showed no bonds characteristic of amide structures. The tensile strength of a compression molded film was found to be 14,700 lbs./sq. in. at 23° C. and the flexural modulus of the film was found to be 427,000 lbs./sq. in at 23° C. The polybenzimidazole was found to retain 65% of its dynamic modulus at 210° C., indicating the outstanding high temperature properties of the polymer. The polymer was manually spun into fibers which could be cold drawn.

The polybenzimidazole was injection molded at 415° C. into a die at 230° C. The flexural modulus of the bar as measured by standard ASTM tests was found to be 383,000 lbs./sq. in. at room temperature and 289,000 lbs./sq. in. at 140° C. In contrast to the polybenzimidazole, the flexural modulus of polyhexamethylene adipamide at 140° C. was only approximately 45,000 lbs./sq. in.

EXAMPLE II

*Polybenzimidazole from the condensation of 1,2-bis(3,4-diaminophenyl) ethane and sebacic acid*

The tetramine used in the present example was prepared by reacting paranitrotoluene with oxygen, potassium hydroxide and methanol to yield 1,2-bis(4-nitrophenyl) ethane as reported by Green et al. J.C.S. 91, 2079 (1907). This compound was hydrogenated to the diamine using a Raney nickel catalyst employing a standard procedure. The tetramine was prepared from the diamine using the procedure outlined in Example I. The 1,2-bis(3,4-diaminophenyl) ethane obtained was a solid melting at 166° C.

An autoclave was charged with 10.00 parts of 1,2-bis-(3,4-diaminophenyl) ethane and 8.35 parts of sebacic acid. The mixture was flushed with nitrogen and heated at 240° C. for a period of 3 hours. The resulting polybenzimidazole could be compression molded into tough, colorless transparent films by heating under pressure to 250° C. The inherent viscosity of the polymer was found to be 0.63 as measured by a 0.5% solution of the polybenzimidazole in m-cresol. The polymer was found to retain 65% of its room temperature stiffness at 210° C.

EXAMPLE III

*Polybenzimidazoles formed by the condensation of 2,2-bis(3,4-diaminophenyl) propane and adipic acid*

The tetramine used in the present invention was prepared from p,p'diaminodiphenylpropane, which was obtained from the condensation of acetone and aniline using a procedure described by J. von Braun Ann. 472, 1 (1929). The p,p'-diaminodiphenylpropane was acetylated, nitrated, deacetylated and reduced to the tetramine according to the procedure described by V. Braun, Ann. 507, 14–36 (1933). On a short path flash distillation at 250° C. and 0.07 mm. pressure the purified 2,2-bis-(3,4-diaminophenyl) propane was found to have a melting point of 147–148° C.

Into an autoclave was charged 10.00 parts of 2,2-bis(3,4-diaminophenyl) propane and 5.70 parts of adipic acid. This mixture was flushed with nitrogen and heated from 200° C. to 305° C. over a period of two hours. The resulting polymer was found to have an inherent viscosity of 0.42 as measured by a 0.5% solution of the polybenzimidazole in m-cresol. The polymer could be molded into amorphous films by heating the polybenzimidazole under pressure to 310° C.

EXAMPLE IV

*Polybenzimidazole obtained by the condensation of 2,2-bis(3,4-diaminophenyl) propane with sebacic acid*

Into an autoclave was charged 10.00 parts of 2,2-bis(3,4-diaminophenyl) propane and 7.89 parts of sebacic acid. The autoclave was flushed wtih nitrogen and heated at 217 to 259° C. for two hours and then heated at 305° C. for an additional 4 hours. The resulting polybenzimidazole was found to have an inherent viscosity of 0.43 as measured by a 0.5% solution of the polymer in m-cresol. The polymer could be molded into transparent films by heating to 300° C. under pressure. X-ray diffraction measurements indicated the polybenzimidazole to be essentially amorphous.

The polybenzimidazoles of the present invention, in general, have inherent viscosities ranging from 0.4 to 1.5. The term "inherent viscosity" or "$\eta_{inh.}$" as used herein is defined by the following equation:

$$\eta_{inh.} = \frac{\ln \eta_{rel}}{C}$$

wherein ln represents hte natural or Naperian logarithm, C is the concentration of the solute in grams/100 cc. of solution and $$\eta_{rel} = \frac{\eta \text{ solution}}{\eta \text{ solvent}}$$

$\eta$ being the viscosity.

The polybenzimidazoles of the present invention are readily modified by copolymerization with polyamide-forming diamines such as tetramethylenediamine and hexamethylenediamine. Two or more bis-phenyl tetramines may be employed. Similarly, two or more dicarboxylic acids may be used to obtain the polybenzimidazoles of the present invention.

The properties of the polybenzimidazoles of the present invention are quite unusual as compared to the conventional condensation polymers. The polybenzimidazoles are high softening polymers which are essentially non-crystalline. Thus, they may be exposed to elevated temperatures without causing embrittlement as is found in many crystalline polymers. In spite of being amorphous polymers, the polybenzimidazoles of the present invention show outstanding retention of properties at elevated temperatures. The polybenzimidazoles have good weatherability and do not embrittle or degrade appreciably on exposure to oxygen. Humidity has only a minor effect on the properties of the polymer.

The novel combination of properties of the polybenzimidazoles makes them useful in the preparation of molded objects, which are useful over a wide range of temperatures. The additional factors of stiffness at high temperatures and humidities permits these polybenzimidazoles to be used in bristle applications and coating of metal or other surfaces. The polybenzimidazoles are also useful in electrical applications where rigidity at elevated temperatures and high softening temperatures are required. The transparency of the polymer is of great use in the production of many molded articles. The polymers of the present invention have increased stability to light and water as compared to the conventional polyamides.

As many apparently widely different embodiments of this invention may be made without departing from the scope thereof, it is to be understood that this invention is not limited to the specific embodiments thereof except as defined in the appended claims.

We claim:

1. A process for the preparation of polybenzimidazoles which comprises heating at a temperature of 100° to 300° C. in the absence of oxygen, substantially equivalent quantities of bis-orthodiaminophenyl compounds having formulae of the class consisting of

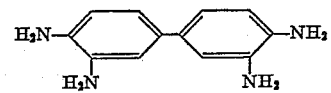

and

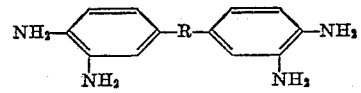

wherein R is a divalent hydrocarbon radical, and an alkane-dioic acid, and recovering a high molecular weight polybenzimidazole having an inherent viscosity of at least 0.4, as measured by a 0.5% solution in m-cresol.

2. A process as set forth in claim 1 wherein the bis-diaminophenyl compound is 3,3'-diaminobenzidine.

3. A process as set forth in claim 1 wherein the bis-diaminophenyl compound is 1,2-bis(3,4-diaminophenyl)ethane.

4. A process as set forth in claim 1 wherein the bis-diaminophenyl compound is 2,2-bis(3,4-diaminophenyl)propane.

5. A process as set forth in claim 1 wherein the dicarboxylic acid is sebacic acid.

6. A process as set forth in claim 1 wherein the carboxylic acid is adipic acid.

7. A linear polybenzimidazole which consists of recurring structural units of the formulae of the class consisting of

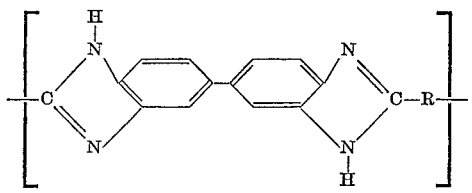

and

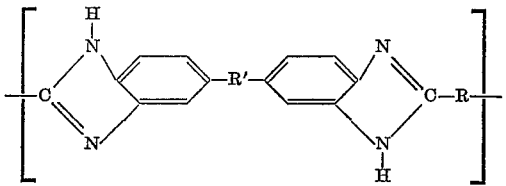

wherein R and R' are divalent hydrocarbon radicals, said polybenzimidazoles having an inherent viscosity of at least 0.4 as measured by a 0.5% solution in m-cresol.

8. A linear polybenzimidazole which consists of recurring units of the formula:

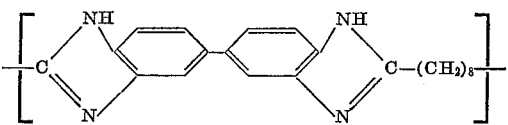

said polybenzimidazole having an inherent viscosity of at least 0.4, as measured by a 0.5% solution in m-cresol.

9. A linear polybenzimidazole which consists of recurring units of the formula:

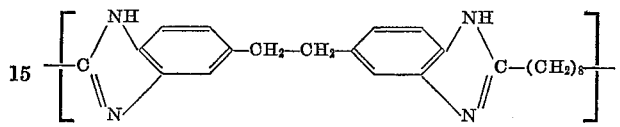

said polybenzimidazole having an inherent viscosity of at least 0.4, as measured by a 0.5% solution in m-cresol.

10. A linear polybenzimidazole which consists of recurring units of the formula:

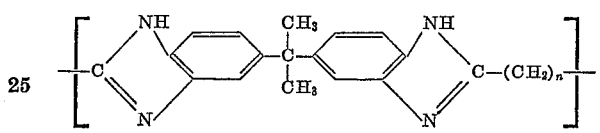

wherein $n$ is 4 to 8, said polybenzimidazole having an inherent viscosity of at least 0.4, as measured by a 0.5% solution in m-cresol.

References Cited in the file of this patent

UNITED STATES PATENTS

| | | |
|---|---|---|
| 2,374,354 | Kaplan | Apr. 24, 1945 |
| 2,463,838 | Wilson | Mar. 8, 1949 |

UNITED STATES PATENT OFFICE

CERTIFICATE OF CORRECTION

Patent No. 2,895,948　　　　　　　　　　　　　　　　　　July 21, 1959

Keith Clark Brinker et al.

It is hereby certified that error appears in the printed specification of the above numbered patent requiring correction and that the said Letters Patent should read as corrected below.

Column 2, line 2, for "hydrogen" read -- hydrocarbon --.

Signed and sealed this 1st day of December 1959.

(SEAL)
Attest:

KARL H. AXLINE
Attesting Officer

ROBERT C. WATSON
Commissioner of Patents